(12) United States Patent
Gao

(10) Patent No.: US 9,517,702 B2
(45) Date of Patent: Dec. 13, 2016

(54) POWER SUPPLY SYSTEM, ELECTRICALLY ASSISTED SYSTEM, AND ELECTRIC GEAR SHIFT SYSTEM

(71) Applicant: Shimano Inc., Sakai, Osaka (JP)

(72) Inventor: Jun Gao, Osaka (JP)

(73) Assignee: Shimano Inc., Osaka (JP)

( * ) Notice: Subject to any disclaimer, the term of this patent is extended or adjusted under 35 U.S.C. 154(b) by 58 days.

(21) Appl. No.: 14/720,137

(22) Filed: May 22, 2015

(65) Prior Publication Data

US 2015/0352973 A1 Dec. 10, 2015

(30) Foreign Application Priority Data

Jun. 9, 2014 (JP) ................................ 2014-118789

(51) Int. Cl.
| | |
|---|---|
| *B62J 99/00* | (2009.01) |
| *B60L 11/18* | (2006.01) |
| *B60R 16/033* | (2006.01) |
| *B60L 1/00* | (2006.01) |
| *B60L 11/00* | (2006.01) |
| *B60L 15/20* | (2006.01) |

(52) U.S. Cl.
CPC ............ *B60L 11/1861* (2013.01); *B60L 1/003* (2013.01); *B60L 11/007* (2013.01); *B60L 15/2045* (2013.01); *B60R 16/033* (2013.01); *B60L 2200/12* (2013.01); *Y02T 10/645* (2013.01); *Y02T 10/72* (2013.01); *Y02T 10/7283* (2013.01)

(58) Field of Classification Search
CPC .......... B60L 11/18; B60R 16/033; B62J 99/00
USPC .................................................. 318/139, 558
See application file for complete search history.

(56) References Cited

U.S. PATENT DOCUMENTS

| | | | |
|---|---|---|---|
| 6,418,041 B1* | 7/2002 | Kitamura | ................... B62J 6/00 315/76 |
| 2006/0255755 A1* | 11/2006 | Shu | ..................... B60L 11/1822 318/139 |
| 2015/0009019 A1* | 1/2015 | Watarai | ..................... B62J 1/08 340/12.5 |

FOREIGN PATENT DOCUMENTS

| | | | |
|---|---|---|---|
| JP | 2010-155523 A | | 7/2010 |
| JP | 2012-166616 A | | 9/2012 |

* cited by examiner

*Primary Examiner* — Bentsu Ro
(74) *Attorney, Agent, or Firm* — Global IP Counselors

(57) ABSTRACT

A power supply system is basically provided for supplying electric power to an electric component of a bicycle. The power supply system includes a first battery, a second battery, an operating unit and a power supply controller. The power supply controller is configured to transition an operating state by electric power of the second battery and supply electric power from the first battery to the electric component when the operating unit is operated in a stopped state.

14 Claims, 4 Drawing Sheets

POWER SUPPLY SYSTEM, ELECTRICALLY ASSISTED SYSTEM, AND ELECTRIC GEAR SHIFT SYSTEM

CROSS-REFERENCE TO RELATED APPLICATIONS

This application claims priority under 35 U.S.C. §119 to Japanese Patent Application No. 2014-118789, filed Jun. 9, 2014. The entire disclosure of Japanese Patent Application No. 2014-118789 is hereby incorporated herein by reference.

BACKGROUND

Field of the Invention

This invention generally relates to a power supply system, an electrically assisted system, and an electric gear shift system for supplying electric power to an electric component of a bicycle.

Background Information

As a power supply system for supplying electric power to an electric component of a bicycle, for example, the system disclosed in Japanese Laid-Open Patent Publication No. 2012-166616 is known. This power supply system comprises a battery and a power supply controller. When the operating unit is controlled, the power supply controller switches between the ON and OFF of supplying electric power from the battery to an assist motor as an electric component.

SUMMARY

In the power supply system of Japanese Laid-Open Patent Publication No. 2012-166616, when the supply of electric power from the battery to the motor is stopped, the supply of electric power to the power supply controller is continued in order to detect the operation of the operating unit. For this reason, the electric power of the battery for supplying electric power to the electric component is consumed in the power supply controller even when the supply of electric power of the battery to the electric component has been stopped.

The aim of the present invention is to provide a power supply system, an electrically assisted system, and an electric gear shift system that can reduce the consumption of electric power from a battery for supplying electric power to an electric component when the supply of electric power from the battery to the electric component has been stopped.

In view of the state of the known technology and in accordance with a first aspect of the present disclosure, a power supply system is provided for supplying electric power to an electric component of a bicycle. The power supply system basically comprises a first battery, a second battery, an operating unit, and a power supply controller that, when the operating unit is operated in a stopped state, transitions to an operating state by the electric power of the second battery and supplies electric power from the first battery to the electric component.

In accordance with a second aspect of the present invention, the power supply system according to the first aspect is configured so that the power supply controller is configured to maintain the operating state by the electric power of the first battery after supplying the electric power from the first battery to the electric component with the electric power from the second battery.

In accordance with a third aspect of the present invention, the power supply system according to the first or second aspect is configured so that the second battery is a rechargeable battery, and the power supply system further comprises a second battery controller configured to charge the second battery with the electric power from the first battery when the electric power is supplied from the first battery to the electric component.

In accordance with a fourth aspect of the present invention, the power supply system according to the third aspect is configured so that the second battery controller is configured to stop the charging of the second battery when a battery level of the second battery becomes greater than or equal to a prescribed battery level.

In accordance with a fifth aspect of the present invention, the power supply system according to any one of the first to fourth aspects aspect is configured so that the operating unit comprises an operating switch, and an operation controller that is configured to supply electric power from the second battery to the power supply controller and output an activation signal to the power supply controller when the operating switch is being operated.

In accordance with a sixth aspect of the present invention, the power supply system according to the fifth aspect is configured so that the power supply controller is configured to supply the electric power from the first battery to the electric component when the activation signal has been received.

In accordance with a seventh aspect of the present invention, the power supply system according to the fifth or sixth aspect is configured so that the operating unit and the power supply controller both comprise a power line communication unit that conducts power line communication.

In accordance with an eighth aspect of the present invention, the power supply system according to any one of the first to seventh aspects further comprises a battery case that houses the first battery, and the power supply controller is disposed outside of the battery case.

In accordance with a ninth aspect of the present invention, the power supply system according to the eighth aspect further comprises a first battery controller that is disposed inside of the battery case, and the power supply controller is configured to communicate with the first battery controller and cause the first battery controller to supply the electric power from the first battery to the electric component.

In accordance with a tenth aspect of the present invention, the power supply system according to any one of the first to ninth aspects is configured so that the power supply controller is configured to stop supplying the electric power from the first battery to the electric component and transition to the stopped state when the operating unit is controlled when in the operating state.

In accordance with an eleventh aspect of the present invention, the power supply system according to any one of the first to tenth aspects further comprises an operation case housing at least a part of the operating unit and the second battery.

In accordance with a twelfth aspect of the present invention, the power supply system according to the eleventh aspect is configured so that the operation case comprises an attaching portion that configured to be attached to a handlebar of the bicycle.

In accordance with a thirteenth aspect of the present invention, an electrically assisted system is provided that includes the power supply system according to any one of the first to twelfth aspects, and further comprising a motor that assists the manual drive force as the electric component.

In accordance with a fourteenth aspect of the present invention, an electric gear shift system is provided that includes the power supply system according to any one of the first to thirteenth aspects, and further comprising an electric transmission as the electric component.

According to the present power supply system, an electrically assisted system, and an electric gear shift system, the consumption of electric power from the battery for supplying electric power to the electric component can be reduced when the supply of electric power from the battery to the electric component has been stopped.

Also other objects, features, aspects and advantages of the disclosed power supply system will become apparent to those skilled in the art from the following detailed description, which, taken in conjunction with the annexed drawings, discloses one embodiment of the power supply system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
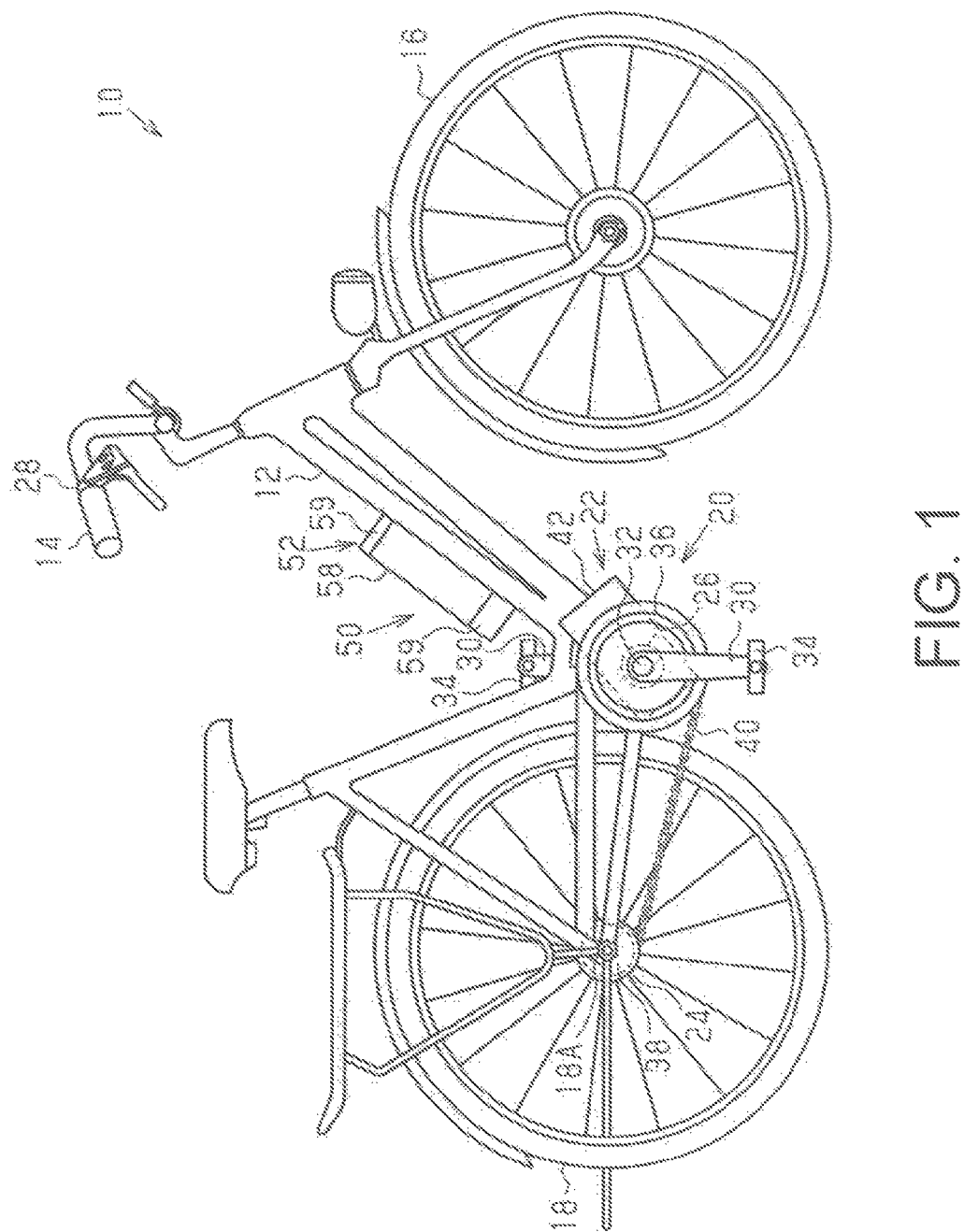
FIG. 1 is a right side elevational view of a bicycle that is equipped with a power supply system in accordance with one illustrated embodiment.

As shown in FIG. 1, a bicycle 10 comprises a frame 12, a handlebar 14, a front wheel 16, a rear wheel 18, a drive mechanism 20, an assist mechanism 22, an electric transmission 24, a pedaling force sensor 26, a shift operating unit 28 and a power supply system 50.

The drive mechanism 20 comprises left and right crank arms 30, a crankshaft 32, left and right pedals 34, a front sprocket 36, a rear sprocket 38, and a chain 40. The left and right crank arms 30 are attached to the frame 12 rotatably with respect to the frame 12 via one crankshaft 32. The pedal 34 is attached to the crank arm 30 in order to be rotatable around a pedal shaft with respect to the crank arm 30.

The front sprocket 36 is coupled with the crankshaft 32. The front sprocket 36 is provided coaxially with the crankshaft 32. The front sprocket 36 can be coupled in order to not rotate relatively with the crankshaft 32, or this sprocket can be coupled via a one-way clutch so that the front sprocket 36 will also roll forward when the crankshaft 32 rolls forward. The rear sprocket 38 is rotatably attached around an axle 18A of the rear wheel 18. The rear sprocket 38 is coupled with the rear wheel 18 via the one-way clutch. The chain 40 is wound to the front sprocket 36 and the rear sprocket 38.

When the crank arm 30 rotates due to the manual drive force that is applied to the pedal 34, the rear wheel 18 is rotated by the front sprocket 36, the chain 40, and the rear sprocket 38.

The assist mechanism 22 as the electric component comprises a motor 42 and a reduction gear (diagram omitted). The motor 42 is an electric motor. The rotation of the motor 42 is transmitted to the front sprocket 36 via the reduction gear. A one-way clutch for preventing the motor from being rotated by the manual drive force when the crank arm 30 rolls forward can be provided between the motor 42 and the front sprocket 36. The assist mechanism 22 of the motor 42 assists the manual drive force that rotates the front sprocket 36 with the drive of the motor 42. The power supply system 50 and the assist mechanism 22 configure the electrically assisted system.

The electric transmission 24 as the electric component is realized by an internal transmission that is integrated with a hub. The electric transmission 24 comprises a plurality of shift positions. The electric transmission 24 comprises an actuator 44 (refer to FIG. 3) and a planetary gear mechanism (diagram omitted) that is controlled by the actuator 44. The actuator 44 is, for example, an electric motor. The actuator 44 changes the shift position of the bicycle 10 by changing the coupling state of the gears that configure the planetary gear mechanism. The power supply system 50 and the electric transmission 24 configure the electric gear shift system.

The pedaling force sensor 26 outputs a signal corresponding to the force that is applied to the crankshaft 32. The force that is applied to the crankshaft 32 is correlated with the manual drive force that is applied to the pedal 34. For this reason, the pedaling force sensor 26 outputs a signal corresponding to the manual drive force. The pedaling force sensor 26 can be provided along the power transmission path from the crankshaft 32 to the front sprocket 36; or this sensor can be provided in the vicinity of the power transmission path or provided to the crank arm 30 or the pedal 34. The pedaling force sensor 26 can be realized by using, for example, a strain sensor, a magnetostrictive sensor, an optical sensor, or a pressure sensor, and any sensor can be employed as long as the sensor outputs a signal corresponding to the manual force that is applied to the crank arm 30 or the pedal 34.

Figure 2:
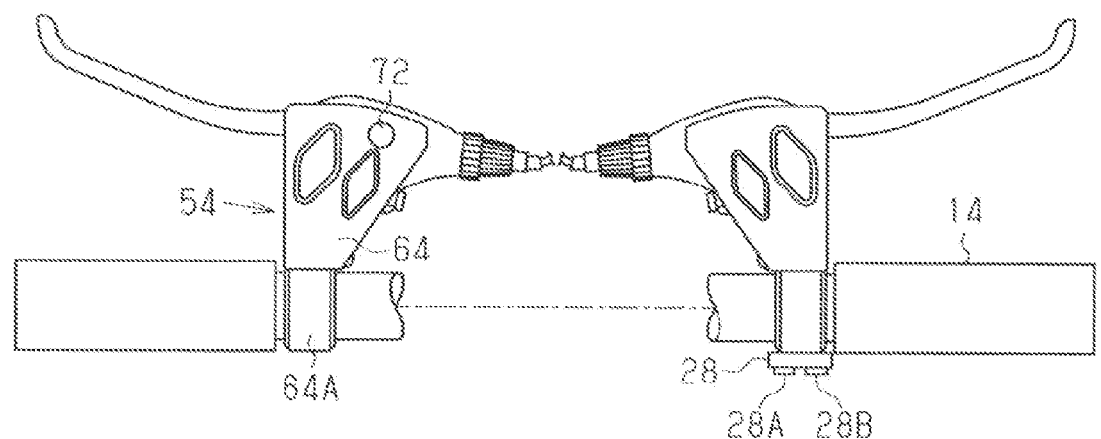
FIG. 2 is a front view near the handlebar of a bicycle comprising the power supply system of the present embodiment.

As shown in FIG. 2, the shift operating unit 28 is attached to the handlebar 14. The shift operating unit 28 comprises a shift-up button 28A and a shift-down button 28B. The shift operating unit 28 outputs a gear changing signal according to the operation of the rider. When the shift-up button 28A has been pressed by the rider, the shift operating unit 28 outputs a shift-up signal. When the shift-down button 28B has been pressed by the rider, the shift operating unit 28 outputs a shift-down signal. Shift-up is the shifting in the direction in which the gear ratio increases, and shift-down is the shifting in the direction in which the gear ratio decreases.

Figure 3:
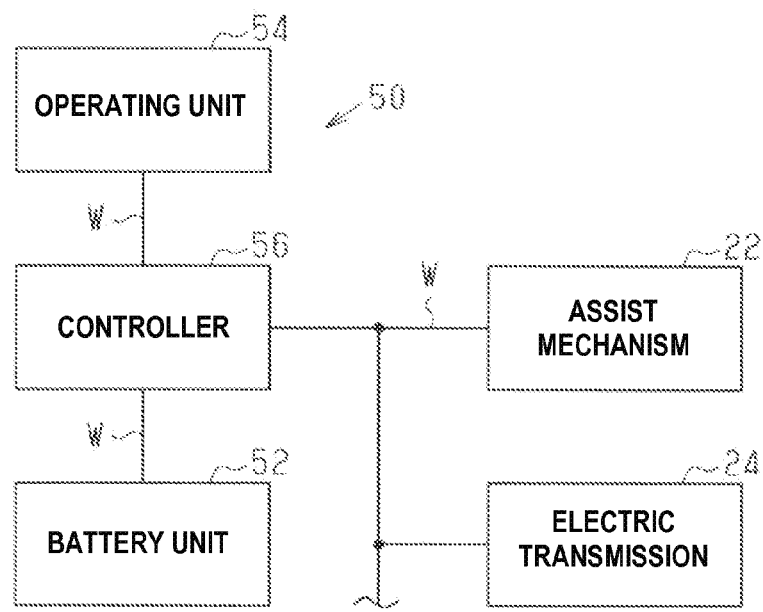
FIG. 3 is a block diagram showing the wiring of a bicycle comprising the power supply system of the present embodiment.

As shown in FIG. 3, the power supply system 50 comprises a battery unit 52, an operating unit 54, and a controller 56. The power supply system 50 is a system for supplying electric power to the assist mechanism 22 and the electric transmission 24. The battery unit 52, the operating unit 54, the controller 56, the assist mechanism 22, and the electric transmission 24 are connected by a bus connection by a power communication line W that conducts the supply of electric power, as well as the transmission and reception of signals. The battery unit 52, the operating unit 54, the controller 56, the assist mechanism 22, and the electric transmission 24 output various signals, along with their identification information that is stored in advance, to the power communication line W.

Figure 4:
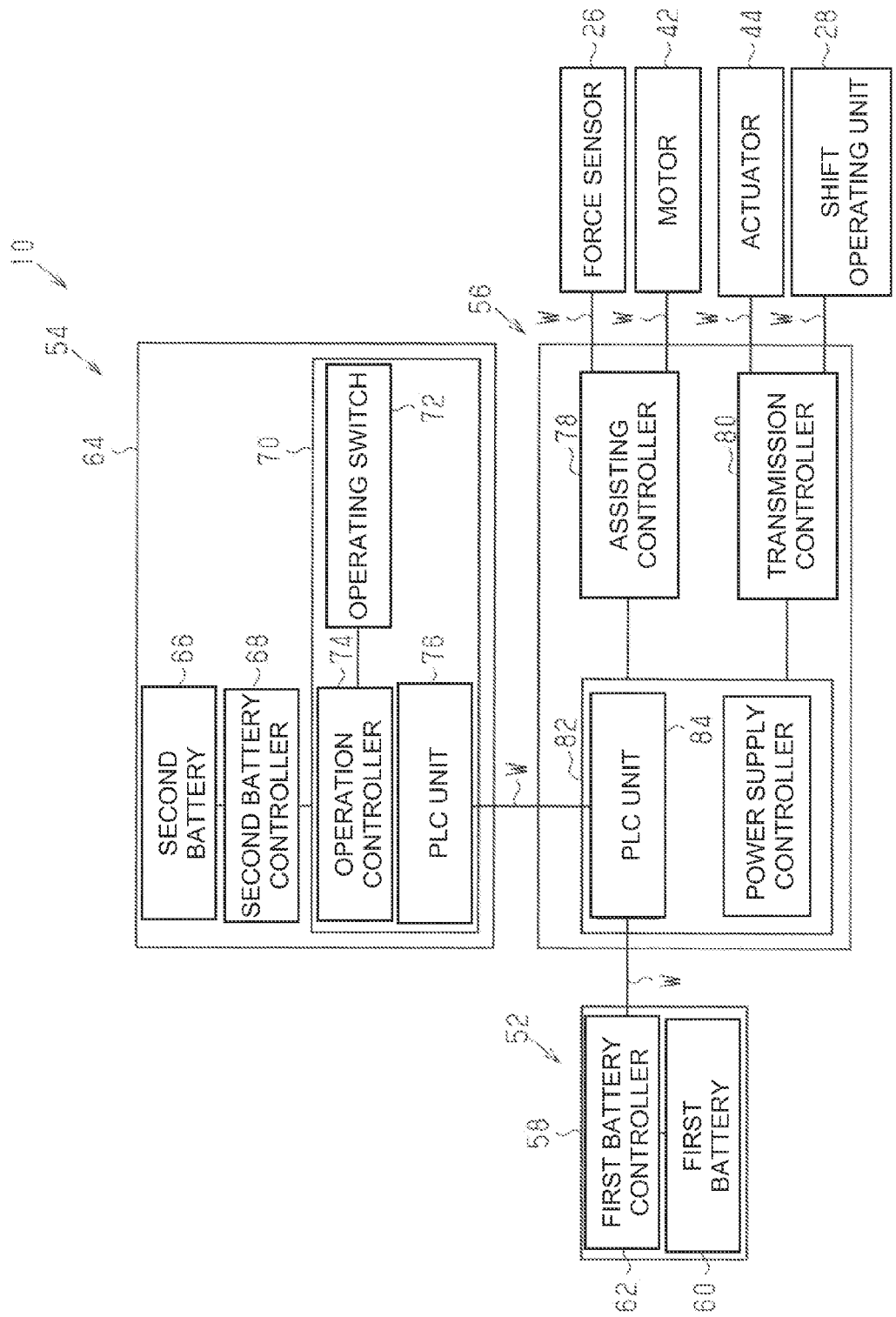
FIG. 4 is a block diagram showing the electric configuration of a bicycle comprising the power supply system of the present embodiment.

As shown in FIG. 4, the battery unit 52 comprises a battery case 58, a first battery 60, and a first battery controller 62. The battery unit 52 further comprises a battery holder 59 for detachably attaching the battery case 58 to the frame 12 (refer to FIG. 1). The battery case 58 houses the first battery 60. The first battery 60 includes one or a plurality of battery cells. The first battery 60 is configured by a rechargeable battery. The first battery controller 62 includes a processor and a memory device with a predetermined software program stored therein. The first battery controller 62 is provided in the battery case 58. The first battery controller 62 controls the supplying and stopping of electric power from the first battery 60 to a power supply controller 82 of the controller 56, the electric component, and the operating unit 54. The first battery controller 62 has a power line communication unit (not diagrammed) and can carry out power line communication (PLC) with the power supply controller 82. The first battery controller 62 detects the charging state of the first battery 60 when charging the first battery 60 and controls the charging.

The operating unit 54 comprises an operation case 64, a second battery 66, a second battery controller 68, and an operating unit 70. The operating unit 70 comprises an operating switch 72, an operation controller 74 and a power line communication (PLC) unit 76. The operation controller 74 includes a processor and a memory device with a predetermined software program stored therein. The second battery controller 68 includes a processor and a memory device with a predetermined software program stored therein.

As shown in FIG. 2, the operation case 64 comprises an attaching portion 64A that can be attached to the handlebar 14. The operation case 64 is attached to the handlebar 14 via the attaching portion 64A. As shown in FIG. 4, the operation case 64 houses the operation controller 74 of the operating unit 70, the power line communication unit 76, and the second battery 66 of the operating unit 70. As shown in FIG. 2, the operating switch 72 is exposed from the operation case 64. In the present embodiment, the operation case 64 is integrally formed to the attaching portion of the brake lever, but this case may be configured as a separate body.

The second battery 66 includes one or a plurality of battery cells. The second battery 66 is a rechargeable battery. The second battery controller 68 comprises a voltage control circuit and controls the charging of the second battery 66 so that the battery level of the second battery 66 will be a prescribed battery level. The second battery controller 68 carries out the charging of the second battery 66 so that a prescribed battery level will be maintained when electric power is being supplied from the controller 56 via the power communication line W. The second battery controller 68 supplies electric power to the power supply controller 82 via the power communication line W in response to an operation of the operating switch 72 when electric power is not being supplied from the controller 56 via the power communication line W.

The operating switch 72 comprises a switching circuit and generates an operation signal SA when the operating switch 72 is operated by the rider. The operating switch 72 is a power switch. In the present embodiment, the supply of electric power from the first battery 60, which is the power source, can be turned ON and OFF by operating one switch. In the present embodiment, the operating switch 72 is a push-type switch. The operating switch 72 can also be a slide-type switch and a touch-panel type switch. The operation controller 74 generates an activation signal SB when an activation signal SA has been input from the operating switch 72 and outputs the signal to the power line communication unit 76. The operation controller 74 can be configured to use the electric power of the second battery 66 and to periodically detect the operation of the operating switch 72 when electric power is not being supplied from the controller 56 via the power communication line W. In this case, since the operation controller 74 is operated intermittently, the power consumption of the second battery 66 can be suppressed. As another embodiment, the operating unit 70 can comprise a logic circuit in which, when the operating switch 72 is operated when electric power is not being supplied to the operation controller 74 from the controller 56 via the power communication line W, the electric power of the second battery 66 is supplied to the operation controller 74. In this case, since the operation controller 74 can be completely stopped, the power consumption of the second battery 66 can be further suppressed.

The controller 56 comprises an assisting controller 78, a transmission controller 80, and the power supply controller 82. The controller 56 includes a processor and a memory device with a predetermined program stored therein. The power supply controller 82 comprises a power line communication (PLC) unit 84 that conducts power line communication. The controller 56 is provided outside of the battery case 58. For this reason, the power supply controller 82 is provided outside of the battery case 58. In the present embodiment, when the supply of electric power from the power source is turned OFF by the operating switch 72, since electric power is not supplied from the first battery 60 and the second battery 66 to the controller 56, the controller 56 will completely stop.

The assisting controller 78 supplies electric power from the first battery 60 to the motor 42 based on a signal that has been output from the pedaling force sensor 26. With this, the assist mechanism 22 executes an assist corresponding to the manual drive force. The assist mechanism 22 further comprises a motor controller and an inverter for driving the motor. The motor controller is connected to the assisting controller 78 by the power communication line W and controls the inverter in response to a command from the assisting controller 78 to drive the motor 42. Here, the diagrams for the motor controller and the inverter have been omitted.

The transmission controller 80 supplies electric power from the first battery 60 to the actuator 44, based on a signal that has been output from the shift operating unit 28. The transmission controller 80 shifts up the shift position of the electric transmission 24 when a shift-up signal has been input. The transmission controller 80 shifts down the shift position of the electric transmission 24 when a shift-down signal has been input. In the case that a shift-up signal has been input when in a shift position with the maximum gear ratio, and when a shift-down signal has been input when in a shift position with the minimum gear ratio, the transmission controller 80 will not change gears. The electric transmission 24 further comprises an actuator controller and a driver for driving the actuator. The actuator controller is connected to the transmission controller 80 by the power communication line W and controls the driver in response to a command from the transmission controller 80 to drive the actuator 44. Here, the diagrams for the actuator controller and the driver have been omitted.

Figure 5:
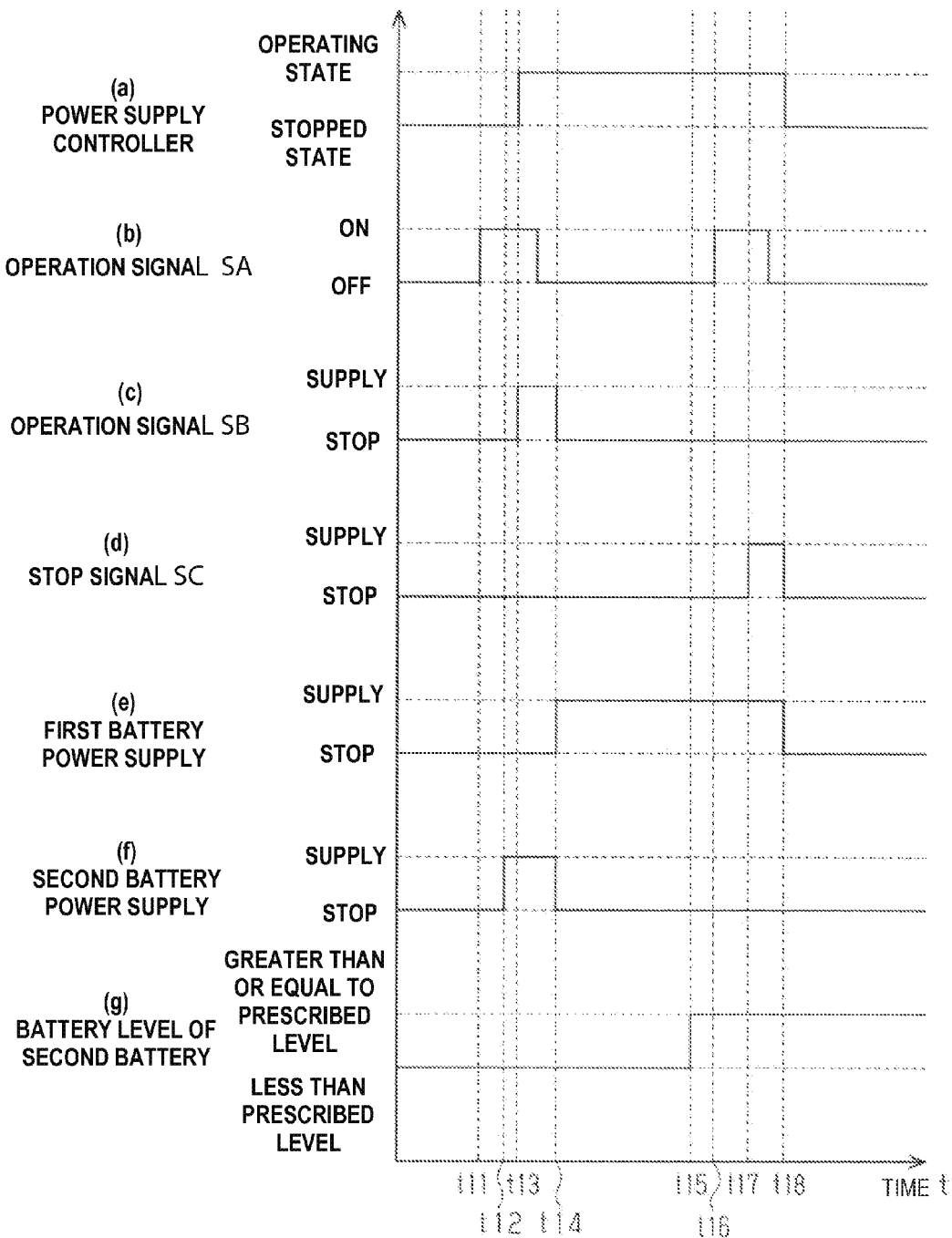
FIG. 5 is a timing chart showing the operation of the power supply system of the present embodiment.

The operation of the power supply system 50 is explained here with reference to FIG. 4 and FIG. 5. In the timing chart of FIG. 5, the horizontal axis indicates time, and the vertical axis indicates the state of each item. Time t11 indicates the time at which the operating switch 72 is operated by the rider when the power supply controller 82 is in a stopped state in which electric power from the first battery 60 is not being supplied. When the operating switch 72 is operated, the operation signal SA switches from OFF to ON; with this, the operation controller 74 determines that the operating switch 72 has been operated.

Time t12 indicates a time at which electric power is supplied from the second battery 66 to the power supply controller 82. When the operation controller 74 determines that the operating switch 72 has been operated, electric power is output from the second battery 66 via the power line communication unit 76, that is, a prescribed voltage from the second battery 66 is applied to the power line communication unit 76. With this, electric power is also provided to the power supply controller 82 via the power communication line W, and the power supply controller 82 is activated from the stopped state.

Time t13 indicates a time at which the operation controller 74 gives an activation signal SB to the power supply controller 82, based on the operation signal SA from the operating switch 72. Since the power supply controller 82 is activated at time t12, the activation signal SB can be recognized.

Time t14 indicates a time at which electric power is supplied from the first battery 60 to the power supply controller 82. The power supply controller 82 communicates with the first battery controller 62 and causes the first battery 60 to supply electric power, based on receiving the activation signal SB. With the electric power of the first battery 60 being supplied to the power supply controller 82, the power supply controller 82 transitions from an operating state in which the electric power of the second battery 66 is used to an operating state in which the first battery 60 is used. When the power supply controller 82 transitions to an operating state in which the electric power of the first battery 60 is used, the power supply from the electric power of the second battery 66 will stop almost simultaneously, and electric power from the first battery 60 is also supplied to the operating unit 54. The stopping of the power supply from the electric power of the second battery 66 can be done using the voltage difference between the first battery 60 and the second battery 66; or the power supply controller 82 can give a signal to stop the power supply to the operation controller 74, and the operation controller 74 can control the stopping of the power supply from the electric power of the second battery 66. In the case of using the voltage difference between the first battery 60 and the second battery 66, the circuit configuration can be simplified.

The power supply controller 82 causes the first battery controller 62 to supply electric power from the first battery 60 to the assist mechanism 22 and the electric transmission 24 after time t14. The power supply controller 82 maintains the operating state after time t14 with the electric power of the first battery 60.

After the supply of electric power from the first battery 60 to the second battery 66 has been started, the second battery controller 68 periodically determines whether or not the battery level of the second battery 66 is less than a prescribed level. In the case that the second battery controller 68 determines whether or not the battery level of the second battery 66 is less than the prescribed level, the charging of the second battery 66 with the electric power of the first battery 60 is started.

Time t15 indicates a time at which the battery level of the second battery 66 changes from less than the prescribed level to greater than or equal to the prescribed level. At this time, the second battery controller 68 stops the charging of the second battery 66. Instead of periodically determining whether or not the battery level of the second battery 66 is less than a prescribed level, the second battery controller 68 can comprise a logic circuit that charges the second battery 66 so that the voltage of the second battery 66 will be equal to the voltage that is applied by the first battery 60 via the power supply controller 82 when the supply of electric power from the first battery 60 to the second battery 66 has been started.

Time t16 indicates the time at which the operating switch 72 is operated by the rider when the power supply controller 82 is in an operating state in which electric power from the first battery 60 is being supplied. The operation controller 74 is activated by electric power from the first battery 60, so that this controller can recognize the operation signal SA.

Time t17 indicates a time at which the operation controller 74 gives a stop signal SC to the power supply controller 82 based on the operation signal SA from the operating switch 72.

Time t18 indicates a time at which the power supply controller 82 transitions to a stopped state. When the power supply controller 82 receives a stop signal SC from the operation controller 74 while being operated by the electric power of the first battery 60, this controller will communicate with the first battery controller 62 to cause a stop in the supply of electric power from the first battery 60 to the controller 56, the assist mechanism 22, and the electric transmission 24 and to transition to the stopped state.

The power supply system 50 exerts the following effects.

(1) When the operating unit 70 is operated in the stopped state, the power supply controller 82 will be operated by the electric power of the second battery 66 and will supply electric power from the first battery 60 to the assist mechanism 22 and the electric transmission 24. That is, when the supply of electric power from the first battery 60 to the controller 56, the assist mechanism 22, and the electric transmission 24 has been stopped, the electric power of the second battery is used. For this reason, when the supply of electric power from the first battery 60 to the controller 56, the assist mechanism 22, and the electric transmission 24 has been stopped, the consumption of electric power of the first battery 60 for supplying electric power to the controller 56, the assist mechanism 22, and the electric transmission 24 can be reduced.

(2) The power supply controller 82 maintains the operating state with the electric power of the first battery 60 after electric power has been supplied from the first battery. For this reason, when the power supply controller 82 is in the operating state, the consumption of electric power from the second battery 66 can be suppressed, so that the electrical capacity of the second battery 66 can be reduced.

(3) The second battery 66 is charged by the electric power of the first battery 60. For this reason, the hassle of charging the second battery 66 with an external power source can be omitted.

(4) The operating unit 70 and the power supply controller 82 each comprises power line communication units 76 and 84, respectively, that conducts power line communication. For this reason, when compared to a case in which the supply of electric power and communication are conducted by separate wires, the complication of wiring can be suppressed.

(5) The second battery 66 is housed in the operation case 64. For this reason, the distance between the second battery 66 and the operating unit 70 can be shortened. As a result, the wiring, which connects the second battery 66 and the operating unit 70, can be suppressed from becoming long and the wiring becoming complex.

(6) The operation case 64 is attached to the handlebar 14 via the attaching portion 64A. For this reason, the rider is able to easily operate the operating switch 72 even when riding the bicycle 10.

The specific form that the present power supply system can take is not limited to the forms illustrated in the above-described embodiment. The present power supply system can take various forms different from the above-described embodiment. The modified example of the above-described embodiment described below is one example of the various forms that the present power supply system can take.

The second battery 66 can be disposed outside of the operation case 64 and near the operation case 64.

The power supply system 50 can further comprise a battery switch. The battery switch is attached, for example, to the battery case 58. When the battery switch is operated when the power supply controller 82 is in the stopped state, the first battery controller 62 supplies the electric power of the first battery 60 to the power supply controller 82 and transitions the power supply controller 82 to the operating state. Then, the power supply controller 82 causes the electric power from the first battery 60 to be supplied to the assist mechanism 22 and the electric transmission 24. When the battery switch is operated in the operating state, the power supply controller 82 causes the supply of electric power from the first battery 60 to the assist mechanism 22 and the electric transmission 24 to be stopped and transitions to the stopped state.

The operating switch 72 can comprise a power ON switch and a power OFF switch as the power switch. In this case, when the power ON switch is operated in the stopped state, the power supply controller 82 will be transitioned to the operating state by the electric power of the second battery 66 and will supply electric power from the first battery 60 to the assist mechanism 22 and the electric transmission 24. When the power OFF switch is operated in the operating state, the power supply controller 82 causes the supply of electric power from the first battery 60 to the controller 56, the assist mechanism 22, and the electric transmission 24 to be stopped and transitions to the stopped state.

The activation signal SB and the stop signal SC are separate, but these can be a common signal. In this case, the power supply controller 82 should determine whether a signal is to activate or is a signal to stop, based on whether or not electric power from the first battery 60 is being supplied.

The operating unit 70 and the controller 56 are connected with the power communication line W, but they can also be connected with a wire that separates the power line from the communication line.

The second battery 66 can be a primary battery as well. The operating unit 54 preferably comprises a holding mechanism that detachably holds the second battery 66.

The assist mechanism 22 can be omitted.

The electric transmission 24 can be changed to a continuously variable transmission that can also continuously change the gear ratio. Additionally, the electric transmission 24 can be changed to an external-type electric transmission. In short, any electric transmission can be employed as long as the electric transmission can change the gear ratio of the bicycle 10.

The electric transmission 24 can be omitted as well.

At least a light or a display device that is equipped with a cycle computer can be employed as the electric component.

The power supply controller 82 is configured as a separate body from the battery unit 52, but the power supply controller 82 can be configured to be included in the battery unit 52.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A power supply system for supplying electric power to an electric component of a bicycle, the power supply system comprising:
   a first battery;
   a second battery;
   an operating unit; and
   a power supply controller configured to transition an operating state by electric power of the second battery and supply electric power from the first battery to the electric component when the operating unit is operated in a stopped state.

2. The power supply system as recited in claim 1, wherein the power supply controller is configured to maintain the operating state by the electric power of the first battery after supplying the electric power from the first battery to the electric component with the electric power from the second battery.

3. The power supply system as recited in claim 1, wherein the second battery is a rechargeable battery, and
   the power supply system further comprises a second battery controller configured to charge the second battery with the electric power from the first battery when the electric power is supplied from the first battery to the electric component.

4. The power supply system as recited in claim 3, wherein the second battery controller is configured to stop the charging of the second battery when a battery level of the second battery becomes greater than or equal to a prescribed battery level.

5. The power supply system as recited in claim 1, wherein the operating unit comprises
   an operating switch, and
   an operation controller configured to supply electric power from the second battery to the power supply controller and output an activation signal to the power supply controller when the operating switch is being operated.

6. The power supply system as recited in claim 5, wherein the power supply controller is configured to supply the electric power from the first battery to the electric component when the activation signal has been received.

7. The power supply system as recited in claim 5, wherein the operating unit and the power supply controller both comprise a power line communication unit that conducts power line communication.

8. The power supply system as recited in claim 1, further comprising
   a battery case housing the first battery, the power supply controller being disposed outside of the battery case.

9. The power supply system as recited in claim 8, further comprising
   a first battery controller disposed inside of the battery case, the power supply controller being configured to communicate with the first battery controller and cause the first battery controller to supply the electric power from the first battery to the electric component.

10. The power supply system as recited in claim 1, wherein
    the power supply controller is configured to stop supplying the electric power from the first battery to the electric component and transition to the stopped state when the operating unit is controlled when in the operating state.

11. The power supply system as recited in claim 1, further comprising
    an operation case housing at least a part of the operating unit and the second battery.

12. The power supply system as recited in claim 11, wherein
    the operation case comprises an attaching portion that configured to be attached to a handlebar of the bicycle.

13. An electrically assisted system including the power supply system as recited in claim 1, and further comprising:
    a motor that assists the manual drive force as the electric component.

14. An electric gear shift system including the power supply system as recited in claim 1, and further comprising:
    an electric transmission as the electric component.

* * * * *